June 3, 1952 J. P. SMITH 2,599,206

ELECTRONIC DELAY SYSTEM

Filed Dec. 24, 1948 2 SHEETS—SHEET 1

Inventor
John P. Smith

By Morris L. Rabin

Attorney

ELECTRONIC DELAY SYSTEM

Filed Dec. 24, 1948 2 SHEETS—SHEET 2

Inventor
John P. Smith
By
Morris A. Rabkin
Attorney

Patented June 3, 1952

2,599,206

UNITED STATES PATENT OFFICE 2,599,206

ELECTRONIC DELAY SYSTEM

John Paul Smith, Cranbury, N. J., assignor to Radio Corporation of America, a corporation of Delaware Application December 24, 1948, Serial No. 67,157

8 Claims. (Cl. 250—27)

This invention relates to improved apparatus for delaying a continuous signal or a complex wave. More specifically, the invention relates to a delay device for waves in the audio band (maximum frequency about 15 kc.) utilizing two single gun storage tubes and circular scanning. The present invention is related to co-pending application, Serial No. 18,119, of Max H. Mesner, filed March 31, 1948, Patent No. 2,579,269 issued December 18, 1951.

In the past, delay networks, as well as other delay devices, have been used to delay audio frequency signals for a desired period of time. However, networks for delaying complex waves for periods of time intended to be covered by the apparatus of the present invention are usually complicated and difficult to construct. In the present invention, a circuit is provided in which two single gun storage tubes, such as those known as the RCA SDT-5, or the "signal plate kinescope" may be used to obtain a delay of a signal, one of the tubes delaying information received during one interval of predetermined length and the second tube delaying information received during the next succeeding interval while the first information is being reproduced. In the present invention, circular scanning is used on both tubes. The delay time may be varied over a wide range up to about 3,000 microseconds, using two tubes.

One object of the present invention is to provide an improved apparatus for delaying an audio frequency signal for a predetermined interval of time.

Another object of the invention is to provide an improved acoustic delay apparatus in which substantially none of the signal is lost.

Another object of the invention is to provide an improved acoustic delay apparatus utilizing a plurality of single gun storage tubes and circular scanning.

Another object of the invention is to provide an improved acoustic delay apparatus utilizing storage tubes and a scanning system with maximum resolution.

Another object of the invention is to provide an improved acoustic delay system utilizing storage tubes and a scanning system requiring no blanking of return lines.

These and other objects will be more apparent and the invention will be more readily understood from the following specification and the accompanying drawings, of which:

Figure 1:
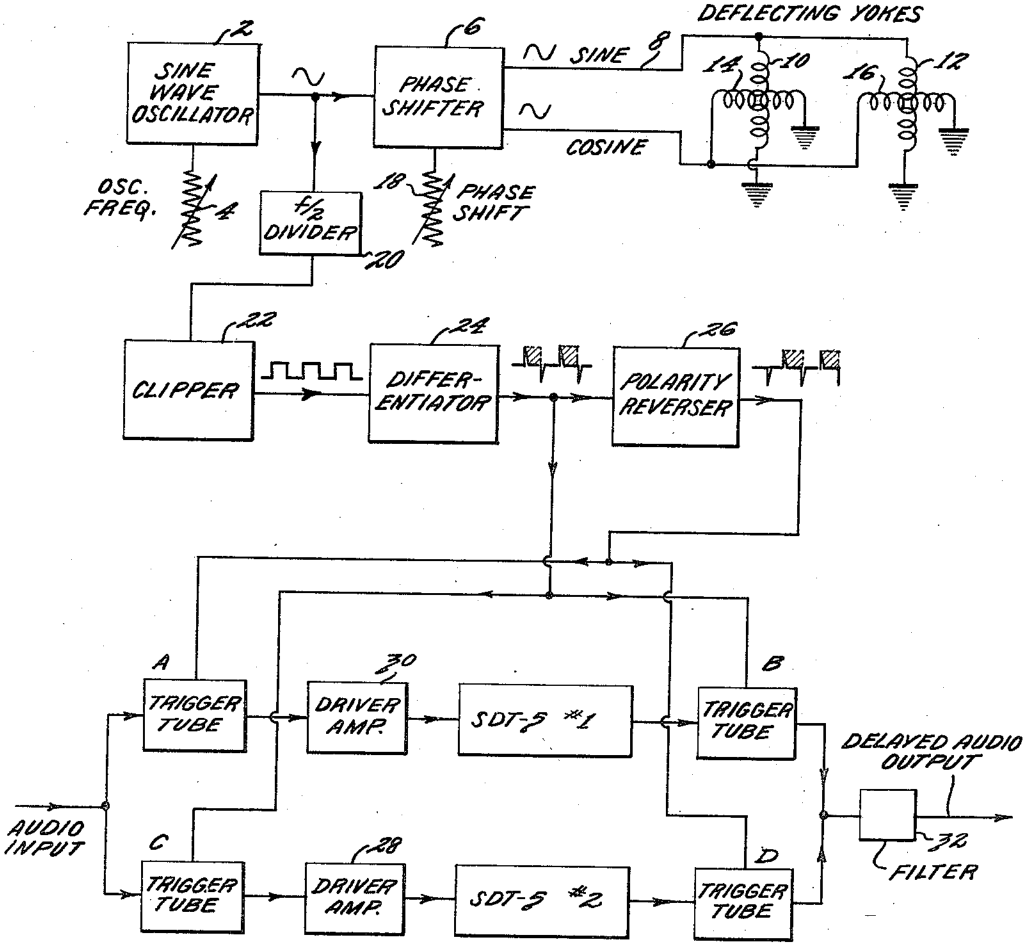
Fig. 1 is a block diagram of one embodiment of the present invention.

Referring now to Fig. 1, a sine wave oscillator 2 supplies a sine wave output, the frequency of which is selected so as to obtain a desired delay interval. The length of the delay interval will be equal to the time length of one complete cycle. Therefore, to obtain, say, a continuous delay of 3,000 microseconds, an oscillator frequency of 333.3 cycles per second would be used. A resistor control 4 may be used to vary the frequency of the oscillator. This oscillator may be any one of many known conventional types. An example of one suitable type is described in Proceedings, I. R. E., volume 29, page 43, 1941.

Part of the output of the oscillator 2 is fed to a phase shifter 6. The sine output 8 of the phase shifter is fed to the horizontal deflection coils 10 and 12 of the deflection yokes of storage tubes No. 1 and No. 2, respectively, while the cosine output is fed to the vertical deflection coils 14 and 16 of these two tubes. The two windings of the yoke are 90 electrical degrees apart.

The phase shifter is controlled through a variable resistor 18 which is adjusted to obtain 90° phase shift of the sine wave output with respect to the cosine wave output and thus produce circular scanning of the screens of the storage tubes. Many different, well known types of phase shifter are suitable for this purpose, one of them being described in the General Electric Review, July 1929, page 394. When the sine wave oscillator frequency is changed to obtain a different delay period, the phase shift control is also varied to get the required 90° shift unless a wide band phase shifter is used.

Another part of the output of the sine wave oscillator 2 is fed to an $f/2$ frequency divider 20 which halves the output frequency, thus doubling the time interval of each oscillation. For example, if the sine wave oscillator 2 produces sine waves, each cycle of which are $\frac{1}{333}$ second long, the length of each cycle of the output wave of the frequency divider will be $\frac{2}{333}$ second long. This frequency divider may be of the type shown in the Bell Laboratories Record, December 1942, page 99. The purpose of the frequency divider is to permit information to be stored on each tube for $\frac{1}{2}$ of each of the longer period cycles. One-half of each of the longer period cycles corresponds to the entire length of each of the original cycles. The above mentioned type of frequency divider is but one of many different types which can be used in the present invention.

The output of the frequency divider 20 is fed to a clipping circuit 22 which produces a square wave output having the same frequency as that of the frequency divider. This clipping circuit may be of the type described in U. S. Patent 2,132,655 of J. P. Smith. Other conventional types of clipping circuits may also be used.

The square wave output of the clipping circuit 22 is then fed to a differentiating circuit 24. The differentiating circuit passes only the high frequency components of the square wave. The high frequency components are represented by the steep sides of the square wave while the tops of these waves represent the low frequencies. Hence, the output of the differentiating circuit is a series of "pips" or pulses of very short duration, say 1 microsecond. These pulses occur at the beginning and end of each half cycle of the square wave and, therefore, have a frequency the same as that of the original output of the sine wave oscillator 2. A suitable differentiating circuit is also shown in the above mentioned Smith patent.

Part of the output of the differentiating circuit 24 is applied to a polarity reversing circuit 26 of any conventional type, which may include an amplifier. The polarity reverser reverses the polarity of the pulse output of the differentiator and aplies this output to each of two trigger tubes A and D, which control the input of storage tube No. 1 and the output of storage tube No. 2, respectively. Another part of the output of the differentiator 24 is fed, without polarity reversal, to two other trigger tubes B and C which control the input of storage tube No. 2 and output of storage tube No. 1, respectively.

The audio input signal from a source (not shown), which is to be delayed by the selected predetermined time interval, is divided and fed in parallel to trigger tube A controlling the input of storage tube No. 1, and to the trigger tube C which controls the input of storage tube No. 2. All trigger tubes are turned on by positive pulses and turned off by negative pulses.

Figures 2, 3:
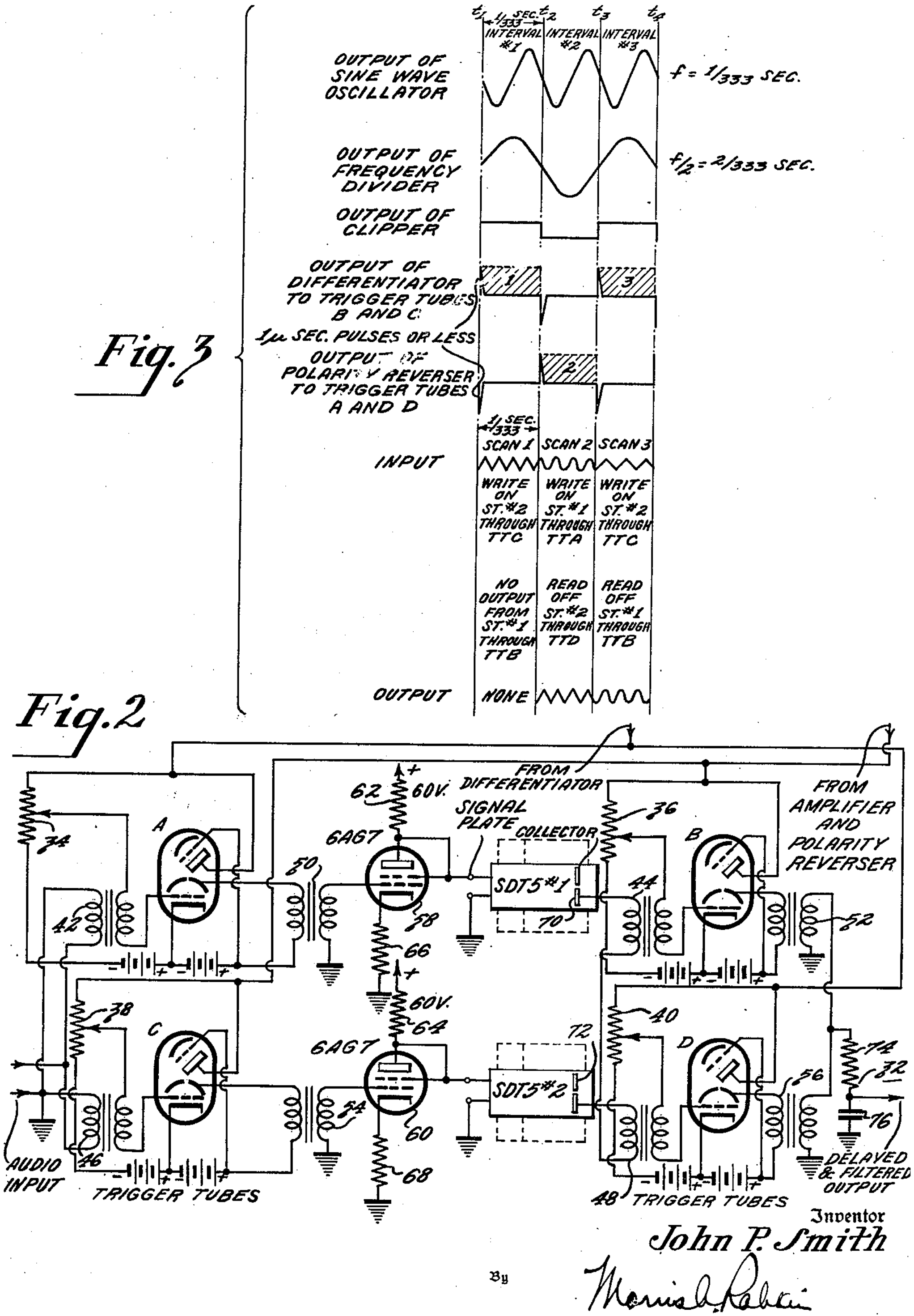
Fig. 2 is a schematic diagram of a preferred form of a partial circuit which may be used in the system shown in the block diagram of Fig. 1.
Fig. 3 is a graphical illustration of wave forms appearing in different parts of the system shown in Fig. 1.

Referring now to Fig. 3, as the apparatus is first put in operation at the beginning of time interval $t_1$ to $t_2$, let a positive pulse be applied from the output of differentiator 24 to the trigger tubes B and C. This permits the audio input signal to be passed through trigger tube C and driver amplifier 28 to storage tube No. 2. During this interval, then, audio signals are stored on the storage elements of tube No. 2. Since a positive pulse is also applied simultaneously to trigger tube B, information would normally be taken from the collector electrode of storage tube No. 1 and passed to the delay audio output. However, when the apparatus is first set in operation, no information is initially stored on storage tube No. 1 and, therefore, no delayed audio output appears during this time interval.

Also, at the beginning of time interval $t_1$ to $t_2$, a negative pulse from the output of polarity reverser 26 is applied to trigger tubes A and D. These two tubes are, therefore, cut off and, during time interval $t_1$ to $t_2$, no audio input is applied to storage tube No. 1 and no output is taken from storage tube No. 2.

At the beginning of time interval $t_2$ to $t_3$, a negative pulse is applied to trigger tubes B and C and a positive pulse is applied to trigger tubes A and D. During this time interval, therefore, there is no audio output from storage tube No. 1; audio input is applied through driver amplifier 30 to storage tube No. 1 and the information stored on storage tube No. 2 during the preceding interval $t_1$—$t_2$ is read off and appears as the delayed audio output.

At the beginning of time interval $t_3$ to $t_4$, a positive pulse is applied to trigger tubes B and C and a negative pulse is applied to trigger tubes A and D. During this time interval, audio input signal is again stored on storage tube No. 2 while the information stored on storage tube No. 1 during the preceding interval appears as the delayed audio output.

This type of operation is repeated during succeeding time intervals such that each part of the audio input is delayed by the selected time interval, which interval may be varied by changing the frequency of the sine wave oscillator.

In order to apply audio input signal alternately to each of the storage tubes and then read off the stored signal first from one tube, then the other, a suitable switching circuit is necessary. An electronic reversing switch is preferred which will connect and disconnect circuits without putting in transients. Or, if some transients are introduced, they should be of such high frequencies as to enable them to be filtered out, as by a conventional filter circuit 32, without appreciably affecting the 15 kc. components of the signal.

In Fig. 2, there is illustrated a preferred form of switching circuit which may be made to have switching times of 1 microsecond or less. There are four identical circuits of this type, two of which control the input and output of storage tube No. 1 and the other two of which control the input and output of storage tube No. 2. Each of these circuits includes a secondary emission trigger type tube A, B, C or D, such as described in the Bell Laboratories Record, April 1943, pages 233–236. This is a vacuum tube which may be turned on and off with a pulse having a time duration of the order of 1 microsecond. Each tube has a cathode, a control grid, a first anode having an opening for the passage of electrons, a reflector, an anode screen and a second anode. If the grid is made positive, some of the electrons flow from the cathode through the opening in the first anode to the reflector which deflects the path of the electrons so that they strike the second anode. The second anode emits secondary electrons which are collected by a collector grid. Control grid bias is supplied to the control grid of each tube by means of grid biasing resistors 34, 36, 38 and 40, respectively, which are connected through the secondaries of audio input transformers 42, 44, 46 and 48, respectively, by means of which transformers audio input signal is also applied to the control grids of each of the trigger tubes.

The first anode of each of the trigger tubes is supplied with a positive potential from a suitable source such as a battery. Each of these anodes is also connected to the primary of an audio output transformer 50, 52, 54 or 56. The second anode of each tube is supplied with an adjusted potential from one of the resistors 34, 36, 38 or 40, which also serve as grid-biasing resistors. The collector grid of each tube may be connected to the same source of positive potential as is connected to the second anode.

There are two potentials, a lower one of which may be called "A" and an upper one of which may be called "B" at which the current to the second anode is zero in this type of tube. The "B" potential is a stable condition resisting any attempt to change it. At the "A" potential, however, the application of even a slight positive pulse to the second anode causes its potential to jump to the "B" condition at which the tube amplifies as an ordinary triode. As the potential of the second anode is raised, the grid is driven a volt or two in the positive direction by the potential so that a small amount of electron current begins to flow in the tube. The sudden jump of the potential of the second anode to the "B" condition carries the potential of the grid to its operating potential. The tube is now in the "on" condition and can be used to amplify the audio input signal.

The tube may be returned to the "off" condition by momentarily applying a negative pulse to the second anode. The negative pulse should be sufficient to drop the potential on the second anode to just below the "A" condition.

The 1 microsecond "spikes" occurring in the delayed audio output may be filtered out by the conventional filter 32 without appreciably affecting the 15 kc. components.

The audio input signal passed by trigger tubes A or C passes through audio output transformers 50 or 54, respectively, to driver amplifier tubes 58 or 60. These tubes each have anode biasing resistors 62 and 64 and cathode biasing resistors 66 and 68, respectively.

The amplified audio input signals are applied to the signal plates of the storage tubes alternately. These tubes are preferably of a type known as RCA SDT-5, a description of which, together with the mode of operation, appears in an article entitled "The Barrier Grid Storage Tube and Its Operation," Smith, Mesner, Flory and Jensen, RCA Review, March, 1948, volume 9, No. 1. This tube was also described in U. S. Patent 2,433,941. The tube includes an evacuated envelope containing a heated cathode at one end. Surrounding the cathode are grids, each of which is provided with an orifice for the passage of electrons supplied by the cathode. In front of the grid structure, there is positioned a collecting electrode 70 or 72. An accelerating anode is present as a metallic coating on the walls of the tube between the collecting electrode and the signal plate. The signal plate consists of a front and a rear portion. The front portion faces the source of electrons and may be a dielectric coating such as aluminum oxide. The rear portion is a metallic plate usually made of aluminum. Immediately in front of the front surface of the signal plate is a metallic screen of fine mesh which is grounded.

The general operation of the tube is as follows. The beam of electrons from the cathode passes through the fine mesh screen striking the dielectric target side of the signal plate at high velocity. Secondary electrons are emitted from the dielectric surface and, if the bombarded area is negative relative to the screen, pass through the screen towards the output or collector electrode. This causes the bombarded area of the target to become more positive, until the potential of the bombarded target area reaches that of the screen. If the bombarded area of the target is positive relative the the screen, the secondary emission from the area is suppressed by the negative field caused by the screen and the target element becomes more negative until it reaches screen potential. When no signal is being impressed on the signal plate from a signal source during the period of scansion, scansion of the beam across the target brings the scanned areas to the potential of the screen. The beam is made to have sufficient intensity to substantially instantly bring the potential of an elemental area to the screen potential.

In the present invention, the dielectric side of the signal plate of each tube is continuously scanned by a beam of electrons in a circular manner, as previously explained. During the time interval, $t_1$ to $t_2$, the audio input signal modulates the signal plate of storage tube No. 2 and each elemental area struck by the electron beam is brought to and left at a potential which is directly proportional to the voltage level of the modulating signal.

During the next time interval, $t_2$ to $t_3$, the audio input signal is similarly stored on the signal plate of storage tube No. 1. During this time interval, also, the signal previously stored on the plate of storage tube No. 2 is read off. This is done by again scanning the coated target side of the signal plate. During this scansion, the number of secondary electrons leaving each elemental area is proportional to the potential at which the area was left by the previous scansion. The secondary electrons travel to the collecting electrode 72 and the original audio input signal is thus reproduced in the output of the tube.

The signal output of storage tube No. 1 is taken from its collecting electrode 70, applied to audio input transformer 44, passed through switching tube B and thence applied by audio output transformer 52 to the delayed output portion of the circuit. The microsecond switching pluses may be filtered out by a convention filtering circuit 32 comprising a suitable resistance 74 and capacitance 76 before being utilized.

Similarly, the signal output of storage tube No. 2 is applied through audio input transformer 48, switching tube D and audio output transformer 56 to the delayed audio output circuit.

There has thus been described an improvced acoustic delay system in which many of the shortcomings of previous systems are eliminated. Circular scanning, for example, permits greater resolution than linear scanning since the scanning path is about 3.14 $n$ times as long as one line in linear scanning. No blanking of return lines is necessary as in a system using television roster scanning because there are no return lines. When sawtooth scanning is used, blanking of the return lines is usually required and the blanking signals normally appear in the output unless eliminated in some manner. Even if eliminated completely, gaps will appear in the delayed output signal.

Systems other than the one described may be used for obtaining circular scanning. One set of yoke coils may be tuned to 70% amplitude on one side of resonance and the other set to 70% amplitude on the other side of resonance. Phase shifting could also be accomplished by means of a transformer.

It is also apparent that the system of the present invention could be used to accomplish still longer delay periods with a larger number of storage tubes. A somewhat more complicated switching system would then be required to turn the input and output of each storage tube on and off in the proper order but the switching means could be of the same type as described above and circular scanning would be accomplished simultaneously in all tubes in exactly the same manner as when only two storage tubes are used. Input signal would be placed on the signal plate of each storage tube in turn in some predetermined order and then read off again in the same order. Outputs of all storage tubes could be combined in a single delayed output signal line as shown in Figs. 1 and 2.

I claim as my invention:

1. Apparatus for delaying an input signal for a predetermined period of time before applying said signal to a utilization circuit, comprising a plurality of storage tubes each having a signal plate electrode of which each elemental area is capable of temporarily storing a charge having a potential proportional to a modulating input signal voltage applied to said electrode, when said area is struck by a beam of electrons of predetermined energy level, means for circulatory scanning each of said electrodes simultaneously with a beam of electrons at said predetermined energy level, means for repeatedly modulating the input signal applied to each of said electrodes in a predetermined order whereby successive portions of said signal are stored on different signal plate electrodes, and means, including said electron beam, for removing said signal portions in the same order after a time delay equal to said predetermined period.

2. Apparatus according to claim 1 including means for recombining said delayed signal portions to form a continuous signal.

3. Apparatus for delaying an input signal for a predetermined period of time before applying said signal to a utilization circuit comprising a first and a second storage tube each having a signal plate electrode of which each elemental area is capable of temporarily storing a charge having a potential proportional to a modulating input signal voltage applied to said electrode, when said area is struck by a beam of electrons of predetermined energy level, means for circularly scanning each of said electrodes simultaneously with a beam of electrons at said predetermined energy level and at a frequency such that each cycle is equal in length to said delay period, means for alternately modulating the input signal applied to said plates, at a periodicity equal to the length of each of said cycles, whereby successive portions of said signal are stored on one of said electrodes and then the other, and means for removing said signal portions alternately from said electrodes after a time delay period equal to said predetermined period.

4. Apparatus according to claim 3 in which said scanning frequency is controlled by a sine wave oscillator and including means for controlling the alternate application of said signal to said signal plate electrodes with voltage pulses derived from the output of said oscillator.

5. Apparatus for delaying an input signal for a predetermined period of time before applying said signal to a utilization circuit, comprising a first and a second storage tube each having a storage electrode of which each elemental area is capable of temporarily storing a charge having a potential proportional to a modulating input signal voltage applied to said electrode, when said area is struck by a beam of electrons of predetermined energy level, means for circularly scanning each of said electrodes simultaneously with a beam of electrons at said energy level and at a frequency such that the time between successive scans is equal to said delay period, means for applying an audio frequency input signal to said electrodes, means for switching said input alternately between electrodes, means for removing the signal stored on one of said electrodes while signal is being stored on the other, and means for combining both parts of said signal in an output circuit.

6. Apparatus according to claim 5 in which said switching means is a vacuum tube which is rendered instantaneously conductive by the application thereto of energy pulses having a duration of the order of 1 microsecond.

7. Apparatus for delaying an input signal for a predetermined period of time before applying said signal to a utilization circuit, comprising means for generating a continuous series of waves having a frequency such that each cycle has a length equal to said delay period, means for deriving pulses of energy alternately positive and negative from said waves, the frequency of said pulses being equal to the frequency of said waves, a first and a second storage tube each having a storage electrode of which each elemental area is capable of temporarily storing a charge having a potential proportional to a modulating signal voltage applied to said electrode, when said area is struck by a beam of electrons of predetermined energy level, means for circularly scanning each of said electrodes, simultaneously and out of phase, with a beam of electrons at said energy level and at a frequency equal to the frequency of said waves, means for simultaneously controlling the signal input of said second storage tube and the signal output of said first storage tube, said last mentioned means being responsive to said positive and negative energy pulses, means for reversing the polarity of a part of the output of said pulse deriving means, means responsive to said pulses of reversed polarity for simultaneously controlling the signal input of said first storage tube and the signal output of said second storage tube, means for applying an audio input signal to said storage electrodes through said signal input controlling means, and means for taking off said signal from said storage electrodes through said output controlling means.

8. Apparatus according to claim 7 in which said wave generating means is a variable frequency oscillator.

JOHN PAUL SMITH.

REFERENCES CITED

The following references are of record in the file of this patent:

UNITED STATES PATENTS

| Number | Name | Date |
|---|---|---|
| 1,851,090 | Fetter | Mar. 29, 1932 |
| 1,946,223 | Mason | Feb. 6, 1934 |
| 2,086,904 | Evans | July 13, 1937 |
| 2,103,431 | Mathes | Dec. 28, 1937 |
| 2,175,573 | Schroter | Oct. 10, 1939 |
| 2,219,021 | Riesz | Oct. 22, 1940 |
| 2,245,364 | Riesz | June 10, 1941 |
| 2,293,899 | Hanson | Aug. 25, 1942 |
| 2,404,306 | Luck | July 16, 1946 |
| 2,404,307 | Whitaker | July 16, 1946 |

OTHER REFERENCES

Electronics Magazine Reference, September 1947, volume 20, pages 80-83, "A Memory Tube" by Haeff.